(12) United States Patent
Daniel et al.

(10) Patent No.: US 11,151,268 B2
(45) Date of Patent: *Oct. 19, 2021

(54) SOFTWARE CONTAINER ACCESS CONTROL

(71) Applicant: British Telecommunications Public Limited Company, London (GB)

(72) Inventors: Joshua Daniel, London (GB); Fadi El-Moussa, London (GB)

(73) Assignee: British Telecommunications Public Limited Company, London (GB)

( * ) Notice: Subject to any disclaimer, the term of this patent is extended or adjusted under 35 U.S.C. 154(b) by 321 days.

This patent is subject to a terminal disclaimer.

(21) Appl. No.: 16/300,210

(22) PCT Filed: May 10, 2017

(86) PCT No.: PCT/EP2017/061238
§ 371 (c)(1),
(2) Date: Nov. 9, 2018

(87) PCT Pub. No.: WO2017/194638
PCT Pub. Date: Nov. 16, 2017

(65) Prior Publication Data
US 2019/0156047 A1    May 23, 2019

(30) Foreign Application Priority Data
May 11, 2016    (EP) .................... 16169264

(51) Int. Cl.
*G06F 7/04* (2006.01)
*G06F 21/62* (2013.01)
(Continued)

(52) U.S. Cl.
CPC ...... *G06F 21/6209* (2013.01); *G06F 9/44505* (2013.01); *G06F 9/468* (2013.01); *G06F 9/5061* (2013.01); *G06F 21/53* (2013.01)

(58) Field of Classification Search
CPC ....... G06N 20/00; G06F 21/53; G06F 9/5077; G06F 2221/2149; G06F 9/44505; G06F 9/468; G06F 9/5061; G06F 21/6209
(Continued)

(56) References Cited

U.S. PATENT DOCUMENTS 7,251,829 B1 *  7/2007  Pagdin .................. G06F 21/577
                                                            714/E11.207
7,647,645 B2 *  1/2010  Edeki ...................... G06F 21/31
                                                                 726/28
(Continued)

FOREIGN PATENT DOCUMENTS

WO    WO 2014/202934 A1    12/2014
WO    WO 2017/194637 A1    11/2017
WO    WO-2017194638 A1     11/2017

OTHER PUBLICATIONS

International Search Report and Written Opinion for corresponding International Application No. PCT/EP2017/061238 dated Jun. 7, 2017; 10 pages.
(Continued)

*Primary Examiner* — Amare F Tabor
(74) *Attorney, Agent, or Firm* — Patterson Thuente Pedersen, P.A.

(57) ABSTRACT

An access control method for a restricted resource in a computer system having an operating system providing isolation between software processes executable in the operating system such that a first process executing in the operating system is prevented from accessing resources of a second process executing in the operating system, the method including receiving a software component for execution as an isolated process in the operating system; receiving a baseline profile for the software component defining characteristics of the software component at a runtime for identifying performance of the software com-
(Continued)

ponent; generating a runtime profile of the software component in execution in the operating system defining characteristics of the component in execution; and permitting access by the software component to the restricted resource based on a comparison of the baseline profile and the runtime profile such that the software component exhibiting undesirable performance is precluded from accessing the restricted resource.

17 Claims, 4 Drawing Sheets

(51) Int. Cl.
    *G06F 21/53*      (2013.01)
    *G06F 9/50*      (2006.01)
    *G06F 9/46*      (2006.01)
    *G06F 9/445*      (2018.01)

(58) Field of Classification Search
    USPC .................................................. 726/22, 27
    See application file for complete search history.

(56) References Cited

U.S. PATENT DOCUMENTS

| | | | | |
|---|---|---|---|---|
| 7,716,291 | B2* | 5/2010 | Thorson | G06Q 20/3821 709/206 |
| 8,326,943 | B2* | 12/2012 | Chinta | G06F 21/53 709/217 |
| 8,601,575 | B2* | 12/2013 | Mullarkey | H04L 43/16 726/22 |
| 9,830,449 | B1* | 11/2017 | Wagner | G06F 9/45558 |
| 10,229,268 | B2 | 3/2019 | Momot | |
| 10,268,522 | B2* | 4/2019 | Ferris | G06F 9/5072 |
| 10,419,450 | B2* | 9/2019 | Muddu | H04L 41/145 |
| 10,754,701 | B1* | 8/2020 | Wagner | G06F 9/5077 |
| 2010/0218261 | A1* | 8/2010 | Schneider | G06F 21/54 726/27 |
| 2011/0106515 | A1 | 5/2011 | Bhamidipaty et al. | |
| 2012/0059876 | A1* | 3/2012 | Chinta | G06F 21/53 709/203 |
| 2012/0198073 | A1 | 8/2012 | Srikanth et al. | |
| 2013/0036208 | A1 | 2/2013 | Dochez | |
| 2013/0298183 | A1 | 11/2013 | McGrath et al. | |
| 2014/0136710 | A1 | 5/2014 | Benari et al. | |
| 2018/0173568 | A1 | 6/2018 | El-Moussa et al. | |

OTHER PUBLICATIONS

Goldmann, "Resource management in Docker"; 18 pages; https://goldmann.pl/blog/2014/09/11/resource-management-in-docker/ [Retrieved Nov. 8, 2018].
Anonymous, "Docker run reference"; 22 pages. https://docs.docker.com/engine/reference/run/ [Retrieved Nov. 8, 2018].
Docker overview | Docker Documentation "Understanding the architecture" at "docs.docker.com/engine/understanding-docker"; 7 pages; https://docs.docker.com/engine/docker-overview/; [Retrieved Nov. 8, 2018].
U.S. Appl. No. 16/300,169, filed Nov. 9, 2018, Inventor(s): Daniel et al.
Application and Filing Receipt for U.S. Appl. No. 15/739,491, filed Dec. 22, 2017, Inventor(s): El-Moussa et al.
International Search Report and Written Opinion for PCT Application No. PCT/EP2017/061237 dated Jun. 23, 2017; 10 pages.
International Search Report and Written Opinion for PCT Application No. PCT/EP2016/061594 dated Aug. 23, 2016; 10 pages.
Andreas M. Antonopoulos, Mastering Bitcoin. Unlocking Digital Crypto-Currencies, Early Release Raw & Unedited; First Edition, Dec. 2014, 282 pages, O'Reilly.
Apcera, "Apcera and Flaw Check Defend Against Docker Workload Vulnerabilities and Malware," Aug. 4, 2015, 2 pages.
Docker, "Docker understand the Architecture," 10 pages.
Footy 'N' Tech, "Docker for Dummies," posted on Aug. 23, 2013, 7 pages.
International Preliminary Report on Patentability for Application No. PCT/EP2017/061237, dated Nov. 22, 2018, 8 pages.
International Preliminary Report on Patentability for Application No. PCT/EP2017/061238, dated Nov. 22, 2018, 8 pages.

* cited by examiner

SOFTWARE CONTAINER ACCESS CONTROL

CROSS-REFERENCE TO RELATED APPLICATION

The present application is a National Phase entry of PCT Application No. PCT/EP2017/061238, filed May 10, 2017, which claims priority from EP Patent Application No. 16169264.5, filed May 11, 2016 each of which is hereby fully incorporated herein by reference.

TECHNICAL FIELD

The present disclosure relates to access control for software components. In particular, it relates to access control for software components executing in an operating system providing isolation between software processes.

BACKGROUND

Software services deployments are increasingly employing operating system functions providing process and namespace isolation. Such isolation allows the containment and execution of application environments in a common base operating system so providing for shared operating system and hardware resources such as kernel, libraries, processor, storage and the like. An example of this approach is the software tool known as "Docker" that employs the Linux operating system-level virtualization "LXC" (Linux Containers) to provide isolated application containers executing in a base Linux operating system. Each container can include software applications, libraries and other resources and containers can be shared for installation on other computer systems. This approach provides many benefits over traditional machine virtualization which requires the instantiation of complete virtualized computing systems in each virtual machine so duplicating common resources.

Containers are increasingly used to package and distribute standardized applications for execution on potentially disparate configurations of a computer operating system. Containers can contain nested containers each of which can be adapted, replaced or removed and new containers may be added. For example, a web application may be formed in a container having a sub-container of particular operating system libraries required, a sub-container for a standardized image of a database installation (such as MySQL), a sub-container for a standardized image of a web server installation etc. Any reconfiguration of any of these sub-containers will result in a new container. Thus deployment of applications by container will result in variants of an original container shared between, and installed upon, one or more computer systems.

The variability of the container content introduces new security challenges. In particular, the inability to depend on a standardized size, content, checksum or arrangement of the application container precludes many integrity verification or malicious activity detecting mechanisms. The need to control undesirable behavior such as malicious performance by software is particularly acute where the software executes in a shared computing system with a common operating system kernel, common processor(s), common memory and other common resources. For example, denial of service could arise where one container performs such as to consume resource to the detriment or exclusion of other applications or containers executing in the computer system.

SUMMARY

Thus it is desirable to provide containerized computer system architectures while alleviating the aforementioned challenges.

The present disclosure accordingly provides, in a first aspect, an access control method for a restricted resource in a computer system having an operating system providing isolation between software processes executable in the operating system such that a first process executing in the operating system is prevented from accessing resources of a second process executing in the operating system, the method comprising: receiving a software component for execution as an isolated process in the operating system; receiving a baseline profile for the software component defining characteristics of the software component at a runtime for identifying performance of the software component; generating a runtime profile of the software component in execution in the operating system defining characteristics of the component in execution; and permitting access by the software component to the restricted resource based on a comparison of the baseline profile and the runtime profile such that the software component exhibiting undesirable performance is precluded from accessing the restricted resource.

Thus embodiments in accordance with the present disclosure provide an approach to detecting potentially undesirable performance of one or more isolated software components such as a container executing in a computer system where computing resources are shared between software components. Embodiments of the disclosure include a baseline profiling of a software component identifying an undesirable performance of the component such as a series of boundary conditions identifying the limits of performance for the component. The baseline profile is employed by at a runtime of the software component to identify where the component, or derivatives of the component, exhibit the undesirable performance such as by meeting or exceeding boundary conditions. This is achieved by generating a runtime profile of the component in execution for comparison with the baseline profile. Undesirable performance is identified by flagging the software component. A response to a positive determination of undesirable performance can take multiple forms. For example, where a shared computer system includes critical or sensitive containers operating alongside a detected troublesome container then container porting to an alternative computer system can be employed. In some embodiments where containers are copied across multiple computer systems (just as an application is installed by many users) sharing of performance information between these systems can provide distributed detection of undesirable behavior in order that remedial action can be undertaken.

In some embodiments, the restricted resource is a cryptographic key for accessing restricted data.

In some embodiments, the resources include one or more of: processing; storage; and input/output resources.

In some embodiments, the resources include one or more of: thread; task; memory; data store; library; network protocol; network connection; network port; stack; heap; peripheral; and an input/output device.

In some embodiments, the isolation includes namespace isolation.

In some embodiments, the one or more characteristics of the baseline profile define performance criteria for identifying undesirable performance of the software component.

In some embodiments, the characteristics include one or more of: an extent or degree of storage consumption of the software component; an extent or degree of processor consumption of the software component; an extent or degree of communication between the software component and another computing component; and a duration of a runtime of the software component.

In some embodiments, an undesirable performance of the software component includes one or more of: an extent or degree of storage consumption of the software component; an extent or degree of processor consumption of the software component; an extent or degree of communication between the software component and another computing component; and a duration of a runtime of the software component.

In some embodiments, the method further comprises: suspending or terminating execution of the flagged software component; and transitioning execution of the flagged software component to an alternative computer system.

In some embodiments, the software component is a software container for execution in a container software environment.

In some embodiments, the container software environment is a Docker environment.

In some embodiments, the software component is modifiable by a user or software by one or more of: inclusion of one or more other software components; and configuration of the software component for execution in the computer system.

In some embodiments, the baseline profile is generated based on profiling of one or more executions of the software component.

In some embodiments, the baseline profile is learned by a machine learning algorithm from multiple executions of the software component.

In some embodiments, the method further comprises, in response to the identification of undesirable performance of the software component, communicating the identification to one or more other computer systems suitable for executing the software component.

The present disclosure accordingly provides, in a second aspect, a computer system including a processor and memory storing computer program code for performing the method described above.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

An embodiment of the present disclosure will now be described, by way of example only, with reference to the accompanying drawings, in which.

DETAILED DESCRIPTION OF THE DRAWINGS

Figure 1:
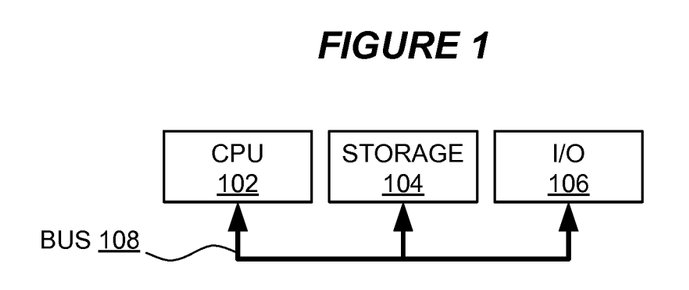
FIG. 1 is a block diagram of a computer system suitable for the operation of embodiments of the present disclosure.

FIG. 1 is a block diagram of a computer system suitable for the operation of components in embodiments of the present disclosure. A central processor unit (CPU) 102 is communicatively connected to storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
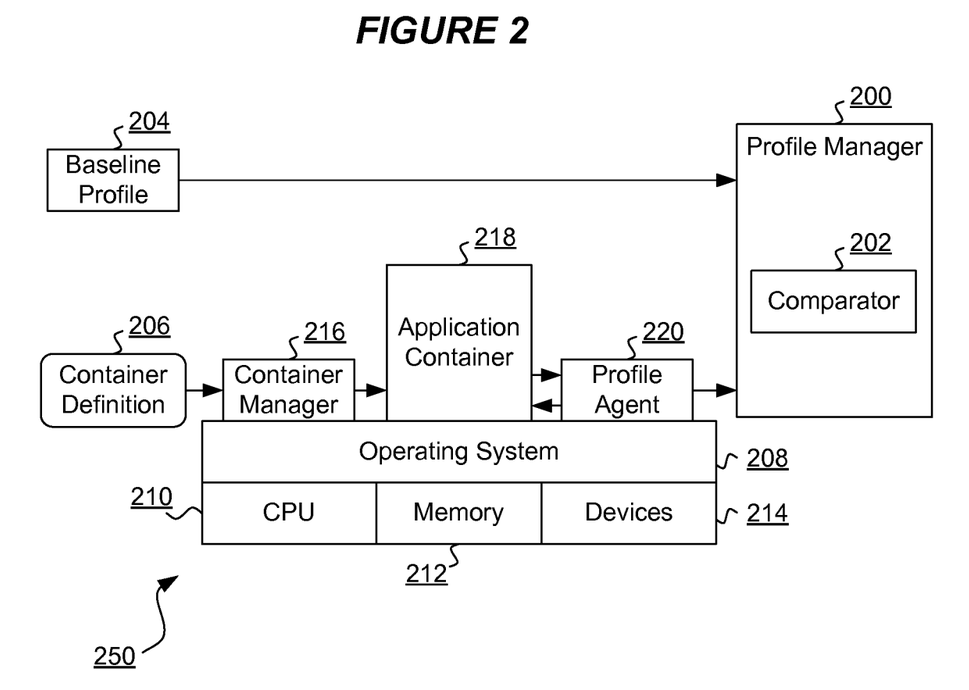
FIG. 2 is an exemplary component diagram of a computer system having an operating system in accordance with an embodiment of the present disclosure.

FIG. 2 is an exemplary component diagram of a computer system 250 having an operating system 208 in accordance with an embodiment of the present disclosure. The computer system includes a processor 210, memory 212 and devices 214 (such as input/output devices and/or peripherals). The operating system 208 provides isolation between software processes executing therein such as application containers. For example, the computer system can include a container manager 216 executed at least in part by the operating system 208 for receiving, installing and executing software containers. Such a container manager is Docker such as the Docker Engine that includes one or more daemon processes for interface by a Docker client through which the Docker Engine is instructed to retrieve and instantiate software containers. The Docker architecture is described in detail at docs.docker.com and in the document "Understanding the architecture" at "docs.docker.com/engine/understanding-docker". The operating system 208 in conjunction with the container manager 216 thus provide the isolation between software processes such that two processes cannot access each other's resources. Such isolation could take a number of forms, such as namespace isolation, address space isolation or the like. All processes execute in the common operating system 208 and on the common computer system 250 so avoiding duplication and redundancy as can be the case in fully virtualized environments employing, for example, a hypervisor.

Examples of resources that are isolated between processes executing in the operating system 208 and are therefore not accessible between processes include, inter alia: processing resources; storage resource; and input/output resources. For example, resources to which access is prevented between isolated processes can include: threads of execution; tasks executing; memory and/or address space; data stores such as data storage devices; libraries, utilities, functions and procedures; network protocols; network connections and facilities; network ports; stack data structures; heap data structures; peripheral devices; and input/output devices such as displays, user interface devices, printers and the like.

In some embodiments the process isolation provided by the operating system 208 includes namespace isolation where processes or groups of processes are separated such that resources of other processes or groups are not accessible. Such a facility can be combined with, for example, the Linux "cgroups" (control groups) facility for isolating the resource usage of one or more processes. Thus, in use, the computer system 250 executes processes such as application containers providing isolation therebetween.

Notably, while the operating system 208 provides isolation between processes as hereinbefore described, processes may still be capable of intercommunication such as by way of network connections or the like between the processes in the same way as unrelated and isolated computer systems can communicated via a network if configured and permitted to do so. Such communication is not necessarily precluded by the operating system 208. Rather it is the execution environment—the process, task, memory, storage, input/output resources and the like for which isolation is effected.

A container definition 206 is received by the container manager 216 for instantiation, installation and/or execution in the operating system 208. The container definition 206 is a software component for execution as an isolated process in the operating system 208. For example, the container definition 206 can be a Docker container obtained from a container repository such as the Docker Hub. The container definition can be an image or template from which a container can be instantiated by or with the container manger 216 for execution as one or more processes in the operating system 208. For example, the container definition 206 can include a definition, identification or specification of one or more parts including nested containers, software applications, services, functions, libraries, drivers and the like. For example, a union file system can be employed to provide a single image of an application or process where multiple file system directories corresponding to different applications are represented in a combined form to provide a merged image of multiple parts of a container.

Additionally, modification of the container definition 206 can take place by the container manager, an operator of the computer system 250 or another software function such as an installer or configuration component. Such modification can include adding, removing, replacing or configuring parts of the container definition 206 so as to configure the container for execution in the computer system 250. For example, particular versions of software may be installed in the container, additional libraries may be provided, and the like.

The container definition 206 has associated a baseline profile 204 as a definition of one or more characteristics of the container 206 when deployed at a runtime for execution in a computer system. The characteristics defined by the baseline profile 204 identify a performance of the container 206 in execution for identifying an undesirable performance of the container in execution. Thus in one embodiment the baseline profile 204 defines characteristics of the container 206 at runtime that are considered normal, acceptable and/or typical so as to define desirable characteristics for operation of the container 206 at runtime. It follows, therefore, that the baseline profile 204 is further suitable for identifying deviations, anomalies and/or differences from the normal, acceptable and/or typical characteristics in order to identify undesirable performance of the container 206 in execution.

Characteristics can include one or more of: an extent or degree of storage consumption of the container 206 in execution; an extent or degree of processor consumption of the container 206 in execution; an extent or degree of communication between the container 206 in execution and another computing component; and a duration of a runtime of the container 206 in execution. In one embodiment the baseline profile 204 defines "boundary conditions" as conditions which, when satisfied or exceeded, serve to identify undesirable performance of the container 206 at runtime. For example, a maximum memory footprint, a maximum processor utilization, a maximum number of files, a minimum period of delay, a maximum amount of network traffic and the like could be employed as boundary conditions. Furthermore, the baseline profile 204 can include criteria for determining undesirable performance such as undesirable behavior or content of the container 206. For example: the inclusion of an excessive number of files, sub-containers, libraries and the like; the inclusion of specific and/or classes of software; the execution of certain functions, etc.

The container definition 206 is used to install, instantiate or otherwise deploy the application container 218 for execution as one or more processes in the operating system 208 of the computer system 250. The application container 218 thus constitutes a software component executing in the computer system 250. A profile agent 220 is a software, hardware, firmware or combination component operable to generate a runtime profile of the application container 218 at runtime, the runtime profile defining characteristics of the application container 218 in execution. Thus the runtime profile reflects the execution of the application container 218 instantiated for execution in the operating system 208 and is suitable for comparison with the baseline profile 204 for the identification of characteristics of the application container 218 in execution that identify the execution as undesirable.

Accordingly, a profile manager 200 is provided as a hardware, software, firmware or combination component for receiving the runtime profile from the profile agent 220 and the baseline profile 204 for comparison by a comparator component 202. The comparison determines if the application container 218 in execution exhibits undesirable performance as defined by way of the baseline profile 204. For example, where the baseline profile 204 defines boundary conditions for identifying undesirable performance, the comparison can determine if the application container 218 at runtime satisfies or exceeds such boundary conditions in order to identify undesirable performance at runtime of the application container 218.

Where undesirable performance of the application container 218 at runtime is identified responsive, reactive, remedial, protective or other measures can be taken. In one embodiment such undesirable behavior is identified to the computer system 250, operators or other entities by indicating, marking, identifying, logging or otherwise flagging the application container 218 as a software component exhibiting undesirable behavior. Additionally, protective measures can be employed such as: suspending or terminating the application container 218; porting or moving the application container 218 to a different computer system (such as where the computer system 250 also executes other sensitive or critical applications); further monitoring the container 218 to further analyze behavior of the container 218; implementing a remediation protocol such as a malware elimination, virus detection and removal, intrusion protection or other security process for the container 218; or other such measures as will be apparent to those skilled in the art. In some embodiments an operator can identify the apparent determination of undesirable performance as a false-positive determination and the baseline profile 204 can be adjusted in response to such identification to prevent future false-positive determinations, such as by adjustment of boundary conditions to accommodate the performance of the application container 218 at runtime.

In one embodiment the computer system 250 is one computer system from potentially many computer systems each potentially receiving and instantiating/executing the container 206 for execution. In such an embodiment the identification of undesirable behavior by the profile manager 200 can be communicated to other computer systems that are (or may be) executing an application container based on the container definition 206 in order that the undesirable behavior identification is shared between computer systems. Similarly, the computer system 250 can receive such notifications from other computer systems executing processes in accordance with embodiments of the present disclosure as hereinbefore described. In such a case a computer system can implement any or all of the responsive actions such as are described above.

The profile manager 200 has been illustrated as a component separate to the computer system 250 though it will be apparent to those skilled in the art that the profile manager 200 could equally be implemented with, in or by the computer system 250. The container manager and profile agent are illustrated as separate components though it will be apparent to those skilled in the art that these components could be combined to a single component.

Thus embodiments of the present disclosure provide an approach to detecting potentially undesirable performance of one or more isolated software components such as the application container 218 executing in the computer system 250 where computing resources are shared between software components. The baseline profile 204 of a software component such as container 206 identifies an undesirable performance of the component such as a series of boundary conditions identifying the limits of performance for the component. The baseline profile is employed by at a runtime of the software component such as application container 218 to identify where the component, or derivatives of the component, exhibit the undesirable performance such as by meeting or exceeding boundary conditions. This is achieved by generating a runtime profile of the component in execution by the profile agent 220 for comparison with the baseline profile 204. Undesirable performance is identified by flagging the software component. Accordingly undesirable behavior can be identified and responsive action taken in spite of the variable nature of software components distributed as containers in operating system environments providing process isolation.

Figure 3:
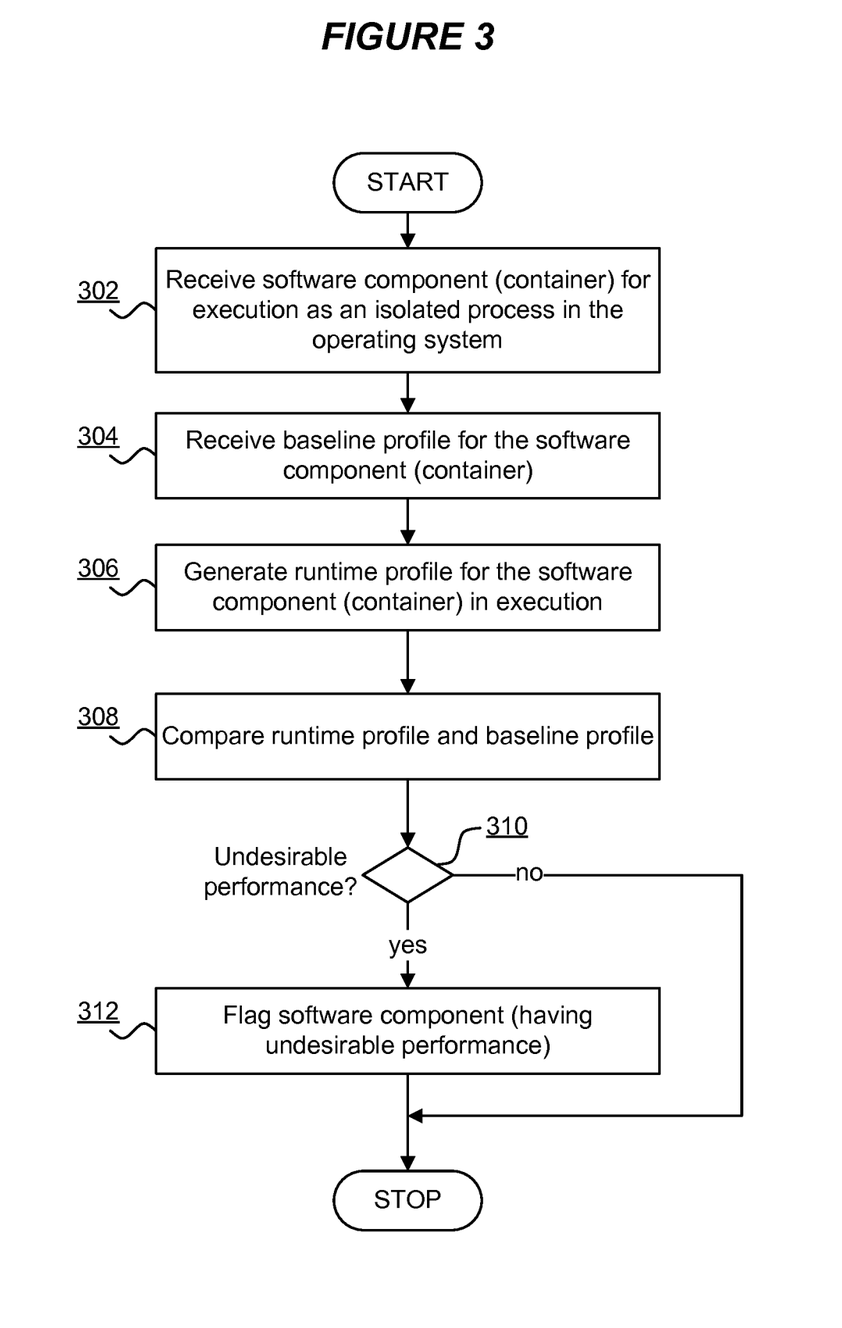
FIG. 3 is an exemplary flowchart of a method of the computer system of FIG. 2 in accordance with an embodiment of the present disclosure.

FIG. 3 is an exemplary flowchart of a method of the computer system 250 of FIG. 2 in accordance with an embodiment of the present disclosure. Initially, at 302, a software component such as container definition 206 is received for execution as an isolated process (application container 218) in the operating system 208. At 304 a baseline profile 204 for the container definition 206 is received, the baseline profile defining one or more characteristics of the container definition 206 when instantiated and executed at a runtime as application container 218 for identifying performance of the container 218. The baseline profile 204 is suitable for identifying an undesirable performance of the container 218 at runtime. At 306 a runtime profile of the container 218 in execution is generated. The runtime profile defines characteristics of the application container 218 in execution. At 308 the comparator 202 compares the baseline profile 204 with the runtime profile to determine if undesirable performance is identified. Where undesirable performance is identified at 310, the method flags the application container 218 at 312 as having undesirable performance. Otherwise the method terminates.

Figure 4:
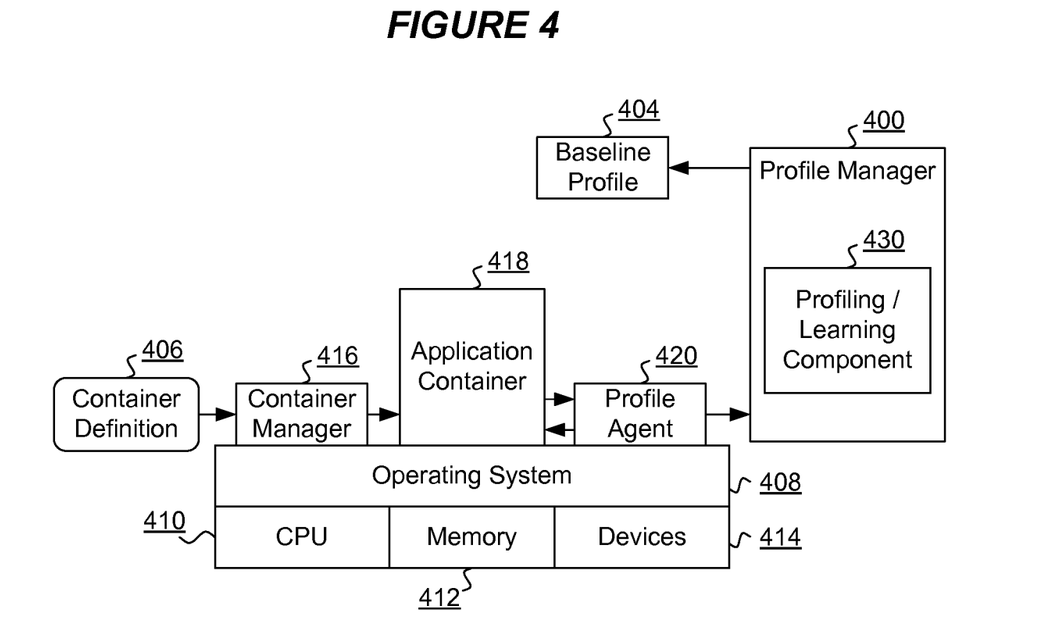
FIG. 4 is an exemplary component diagram of a computer system for generating the baseline profile of FIG. 2 in accordance with an embodiment of the present disclosure.

FIG. 4 is an exemplary component diagram of a computer system for generating the baseline profile 404 of FIG. 2 in accordance with an embodiment of the present disclosure. The arrangement of FIG. 4 includes a computer system sharing many features in common with the computer system 250 of FIG. 2 and common features will not be elaborated again here. The arrangement of FIG. 4 is adapted to generate the baseline profile 404 such that the baseline profile 404 defines characteristics of the application container 418 at runtime identifying an undesirable performance of the application container 418. Notably the identification of such undesirable performance may be achieved by a baseline profile 404 that defines desirable performance, with undesirable performance being determined in the absence of a desirable performance. The profile manager 400 of the arrangement of FIG. 4 thus includes a profiling or learning component 430 for receiving runtime profiles from the profile agent 420 for the application container 418. In the arrangement of FIG. 4 the application container 418 is instantiated based on a known desirable container definition 406 such that the performance of the application container 418 is predetermined to be desirable. That is, the application container 418 is known or assumed not to contain undesirable code, functions, software, routines or exhibit undesirable performance, behavior or the like. For example, the application container 418 does not contain malware or malconfiguration. Accordingly the profiling of the application container 418 at runtime can be used to define the baseline profile 404 or desirable performance of the container 418. The profiling/learning component 430 thus receives runtime profiles from the profile agent 420 for potentially multiple executions of the application container 418 in potentially many different use-cases so as to generate a reasonable profile of performance of the application container 418.

In one embodiment the application container 418 is executed in multiple computer systems or in multiple configurations of a computer system to generate a baseline profile 404 representative of this variance of computing environment.

The profiling/learning component 420 can generate the baseline profile based on ranges of characteristics of multiple executions of the application container 418 such as: the maximum memory consumed across all executions of the container 418; the maximum processor utilization across all executions of the container 418; the maximum network communication volume, rate or frequency across all execution of the container 418; and the like. Alternatively the profiling/learning component 430 can employ machine learning algorithms such as supervised machine learning algorithms to generate the baseline profile 404 which can take the form of, for example, a neural network. In such an embodiment the use of the baseline profile 404 at runtime to detect undesirable performance can include the application of a runtime profile for a container deployed to a production environment to the neural network to determine if the neural network recognizes the profile as that reflecting a desirable performance.

Figure 5:
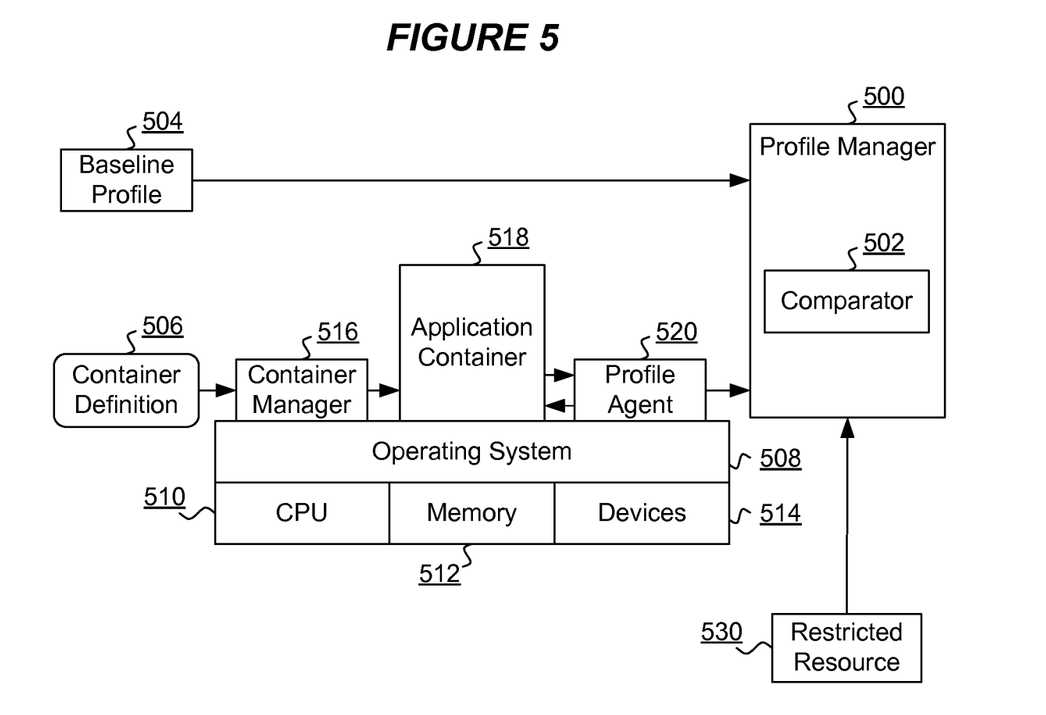
FIG. 5 is an exemplary component diagram of a computer system having an operating system in accordance with an embodiment of the present disclosure.

FIG. 5 is an exemplary component diagram of a computer system having an operating system 508 in accordance with an embodiment of the present disclosure. The arrangement of FIG. 5 includes a computer system sharing many features in common with the computer system 250 of FIG. 2 and common features will not be elaborated again here. The arrangement of FIG. 5 further includes a restricted resource 530 such as, inter alia: a restricted or secure data store; data item; processing resource; restricted software; restricted or licensed media including multimedia; a cryptographic key, token, authentication entity or the like for accessing a protected resource; and other such resources as will be apparent to those skilled in the art. While the restricted resource is illustrated separated from the computer system it could alternatively be provided as part of the computer system, for example protected, in part, by the isolation function of the operating system 508.

In use the application container 518 seeks to access the restricted resource 530 and the manner for determining whether the application container 518 is permitted to access the restricted resource 520 is by determining if the container 518 exhibits desirable performance as previously described. Thus the profile manager 500 determines if the container 518 at runtime exhibits desirable performance based on a comparison between the baseline profile 504 and a runtime profile generated by the profile agent 520. Where desirable performance is identified, access to the restricted resource 530 by the container 518 can be permitted. In contrast, where undesirable performance is identified, access to the restricted resource 530 by the container 518 can be precluded. In this way access to the restricted resource 530 can be constrained to only those software components exhibiting desirable performance irrespective of any other access control mechanisms which may be implemented.

In one embodiment, for example, the restricted resource 530 can be generally available for access by software components but restricted in the sense that components determined to exhibit undesirable performance are precluded from accessing it. For example, resources available via the internet or a web page can employ these techniques so as to permit access to software components exhibiting desirable performance and preclude access where performance exhibits, for example, repeated attempts to access the resource, overconsumption of the resource, malicious use of the resource and the like.

Figure 6:
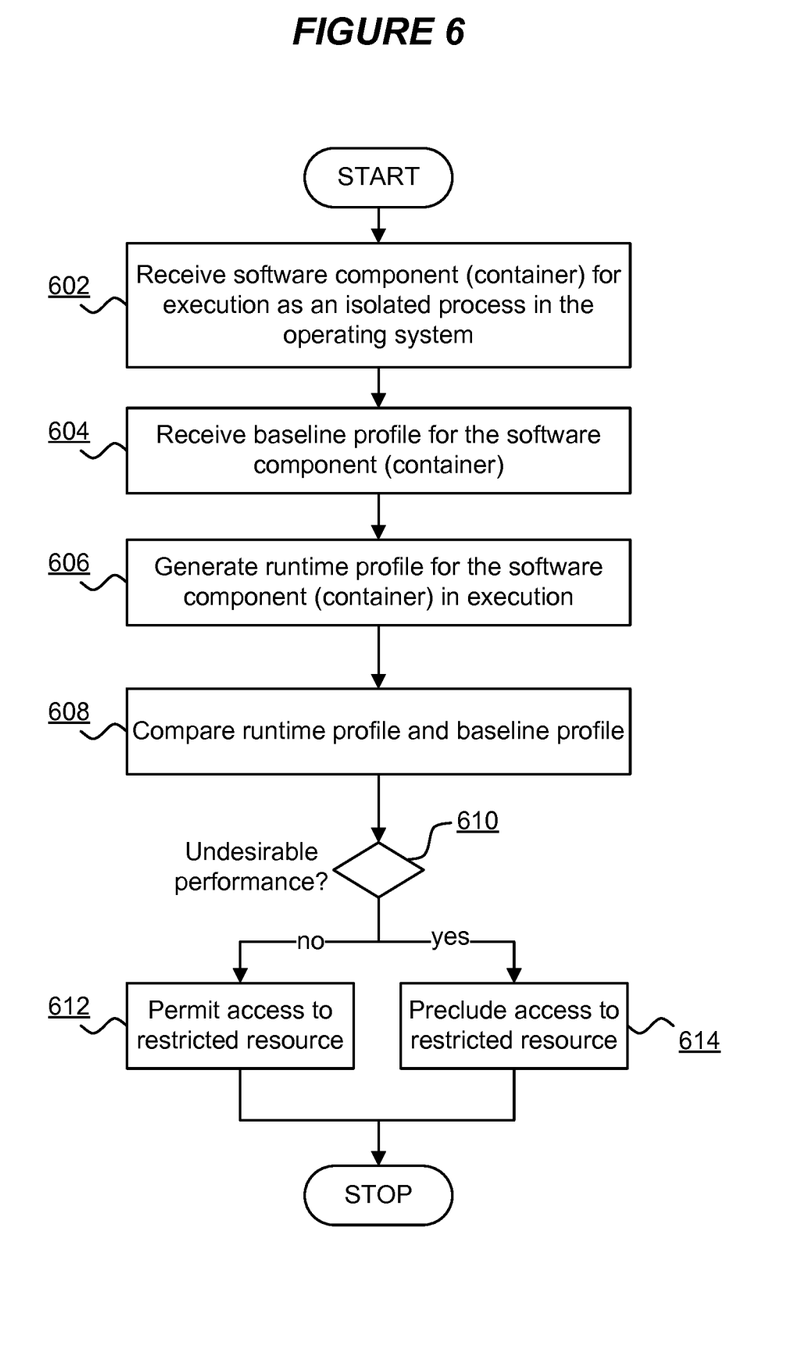
FIG. 6 is an exemplary flowchart of a method of the computer system of FIG. 5 in accordance with an embodiment of the present disclosure.

FIG. 6 is an exemplary flowchart of a method of the computer system of FIG. 5 in accordance with an embodiment of the present disclosure. Initially, at 602, a software component such as container definition 206 is received for execution as an isolated process (application container 218) in the operating system 208. At 604 a baseline profile 204 for the container definition 206 is received, the baseline profile defining one or more characteristics of the container definition 206 when instantiated and executed at a runtime as application container 218 for identifying performance of the container 218. The baseline profile 204 is suitable for identifying an undesirable performance of the container 218 at runtime. At 606 a runtime profile of the container 218 in execution is generated. The runtime profile defines characteristics of the application container 218 in execution. At 608 the comparator 202 compares the baseline profile 204 with the runtime profile to determine if undesirable performance is identified. Where undesirable performance is identified at 610, access to the restricted resource 530 is precluded. Alternatively, where undesirable performance is not identified at 610, access to the restricted resource 530 is permitted.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the claims.

The scope of the present invention includes any novel features or combination of features disclosed herein. The applicant hereby gives notice that new claims may be formulated to such features or combination of features during prosecution of this application or of any such further applications derived there from. In particular, with reference to the appended claims, features from dependent claims may be combined with those of the independent claims and features from respective independent claims may be combined in any appropriate manner and not merely in the specific combinations enumerated in the claims.

The invention claimed is:

1. An access control method for a restricted resource in a computer system having an operating system providing isolation between software processes executable in the operating system such that a first process executing in the operating system is prevented from accessing resources of a second process executing in the operating system, the method comprising:
receiving a software component for execution as an isolated process in the operating system;
receiving a baseline profile for the software component defining one or more desirable characteristics of the software component at a runtime for identifying performance of the software component;
generating a runtime profile of the software component in execution in the operating system, the runtime profile defining one or more actual characteristics of the software component in execution; and
permitting or denying access by the software component to the restricted resource based on a comparison of the baseline profile against the runtime profile such that the software component exhibiting undesirable performance is precluded from accessing the restricted resource, wherein the comparison of the baseline profile against the runtime profile includes at least one evaluation of the one or more actual characteristics to the one or more desirable characteristics.

2. The method of claim 1, wherein the restricted resource is a cryptographic key for accessing restricted data.

3. The method of claim 2, wherein the resources include one or more of: processing resources; storage resources; or input/output resources.

4. The method of claim 1, wherein the resources include one or more of: thread; task; memory; data store; library; network protocol; network connection; network port; stack; heap; peripheral; or an input/output device.

5. The method of claim 1, wherein the isolation includes namespace isolation.

6. The method of claim 1, wherein the one or more desirable characteristics of the baseline profile define performance criteria for identifying undesirable performance of the software component.

7. The method of claim 6, wherein the one or more desirable characteristics of the software component include one or more of: an extent or degree of storage consumption of the software component; an extent or degree of processor consumption of the software component; an extent or degree of communication between the software component and another computing component; or a duration of a runtime of the software component.

8. The method of claim 1, wherein an undesirable performance of the software component includes one or more of: an extent or degree of storage consumption of the software component; an extent or degree of processor consumption of the software component; an extent or degree of communication between the software component and another computing component; or a duration of a runtime of the software component.

9. The method according to claim 1, further comprising:
suspending or terminating execution of the flagged software component; and
transitioning execution of the flagged software component to an alternative computer system.

10. The method according to claim 1, wherein the software component is a software container for execution in a container software environment.

11. The method of claim 10, wherein the container software environment is a Docker environment.

12. The method of claim 1, wherein the software component is modifiable by a user or software by one or more of: inclusion of one or more other software components; or configuration of the software component for execution in the computer system.

13. The method of claim 1, wherein the baseline profile is generated based on profiling of one or more executions of the software component.

14. The method of claim 13, wherein the baseline profile is learned by a machine learning algorithm from multiple executions of the software component.

15. The method of claim 1, further comprising:
in response to the identification of undesirable performance of the software component, communicating the identification to one or more other computer systems suitable for executing the software component.

16. A computer system comprising:
a processor and memory storing computer program code to:
receive a software component for execution as an isolated process in the operating system;
receive a baseline profile for the software component defining one or more desirable characteristics of the software component at a runtime for identifying performance of the software component;
generate a runtime profile of the software component in execution in the operating system, the runtime profile defining one or more actual characteristics of the software component in execution; and
permit or deny access by the software component to the restricted resource based on a comparison of the baseline profile against the runtime profile such that the software component exhibiting undesirable performance is precluded from accessing the restricted resource, wherein the comparison of the baseline profile against the runtime profile includes at least one evaluation of the one or more actual characteristics to the one or more desirable characteristics.

17. A non-transitory computer-readable storage medium storing a computer program element comprising computer program code to, when loaded into a computer system and executed thereon, cause the computer to provide access control for a restricted resource in a computer system having an operating system providing isolation between software processes executable in the operating system such that a first process executing in the operating system is prevented from accessing resources of a second process executing in the operating system, by:
receiving a software component for execution as an isolated process in the operating system;
receiving a baseline profile for the software component defining one or more desirable characteristics of the software component at a runtime for identifying performance of the software component;
generating a runtime profile of the software component in execution in the operating system, the runtime profile defining one or more actual characteristics of the software component in execution; and
permitting or denying access by the software component to the restricted resource based on a comparison of the baseline profile against the runtime profile such that the software component exhibiting undesirable performance is precluded from accessing the restricted resource, wherein the comparison of the baseline profile against the runtime profile includes at least one evaluation of the one or more actual characteristics to the one or more desirable characteristics.

\* \* \* \* \*